Jan. 2, 1923.
J. W. OLIVER.
METHOD OR PROCESS FOR MAKING ROTATABLE TOOL CARRIERS FOR PLANING MACHINES AND THE LIKE.
FILED MAR. 28, 1921.

1,440,931.

Witness:
Geo. L. Chapel

Inventor:
Joseph W. Oliver
by Cyrus W. Rice
his Attorney.

Patented Jan. 2, 1923.

1,440,931

UNITED STATES PATENT OFFICE.

JOSEPH W. OLIVER, OF GRAND RAPIDS, MICHIGAN.

METHOD OR PROCESS FOR MAKING ROTATABLE TOOL CARRIERS FOR PLANING MACHINES AND THE LIKE.

Application filed March 28, 1921. Serial No. 456,155.

*To all whom it may concern:*

Be it known that I, JOSEPH W. OLIVER, a citizen of the United States, residing at Grand Rapids, in the county of Kent and State of Michigan, have invented new and useful Improvements in Methods or Processes for Making Rotatable Tool Carriers for Planing Machines and the like, of which the following is a specification.

The present invention relates to methods or processes for making rotatable tool-carriers for planing machines and the like; and its object is to provide simple and improved methods or processes for making such tool-carriers.

My methods or processes are hereinafter set forth, and a tool-carrier made by such processes or methods is illustrated by the accompanying drawings, in which:—

Figures 1, 2, 3, 4, 5:
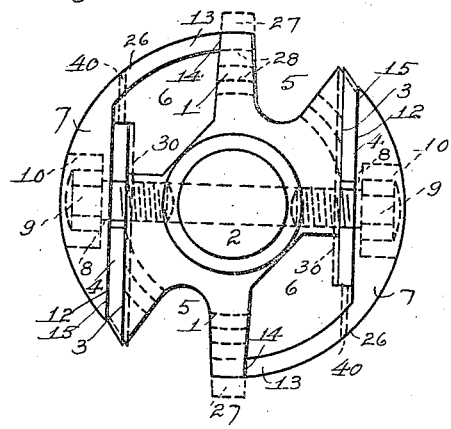
Figure 1 is an end view of a rotatable tool-carrier for a planing machine.
Figure 2 is a side view of a portion of the same.
Figure 3 is an end view of a blank used in making pairs of tool-clamping members of such a carrier.
Figure 4 is an end view of such a tool-clamping member.
Figure 5 is an inner side view of the same.

In the tool-carrier chosen for illustration by the drawings and for detailed description in the body of this specification, the elongated body member 1 of the rotatable tool-carrier has formed at its ends means for mounting it rotatably, as the journals 2. This body member has one or more (two in the construction illustrated) table portions 3, being flat surfaces on which lie the tools, as the plane bits or irons 4, and also has adjacent the opposite sides respectively of each such table portion, a first recess 5 and a second recess 6, such recesses being continuous grooves or depressions extending in the longitudinal direction of the body member as shown.

This tool-carrier is made by rolling a suitable metal bar or blank lengthwise through a rolling mill, whereby the table portions and the recesses are formed by suitably shaped rollers of the mill. The table portions are "machined" or dressed down to a sufficient degree to provide a surface of flat or plane form and at a proper distance from the axis of the body member to receive the tool or plane bit. The tool-clamping members 7 are adapted to co-operate with the body member 1 of the tool-carrier to clamp the tools 4 between said members, and to that end they are provided with orifices 8 therethrough adapted to receive the shanks of bolts 9 threaded in the body member as shown. The outer portions of these orifices are enlarged at 10 to receive the heads of such bolts. These tool-clamping members 7 desirably have concave inner surfaces 11 and plane portions 12 adjacent the bolts' orifices 8, which plane surfaces are adapted to contact with the tools when the same are clamped in the tool-carrier. It is desirable that the tool-clamping member 7 shall clampingly engage the tool near its cutting edge (i. e. adjacent the first recess 5) more tightly than said tool is thus engaged further back from its cutting edge, as toward the clamping bolts 9. To effect this end, the tool-clamping members are provided with rearward portions 13 adapted to abut against that side 14 of the second recess 6, which side is remote from the tool; the inner surface of the tool-clamping members at 15 engaging the tools near their cutting edges and the rearward abutting portions 13 of the tool-clamping members engaging the sides 14 of the second recesses 6 tightly under the action of the bolts, before such bolts (located between said tightly engaging portions of the tool-clamping members) are turned sufficiently to press or spring the plane surfaces 12 of said members into close engagement with the tools more rearwardly from their cutting edges. To provide for a proper formation of the rearward portion of the tool-clamping member, the edge of its said portion 13 (as such member is first formed) desirably extends further than necessary to accomplish the end above described and is thereafter cut or dressed down sufficiently to enable the members 1 and 7 to securely clamp the tool between them in the manner described.

This tool-clamping member 7 is made in pairs by forming an elongated blank 20 (seen in Figure 3) substantially circular in cross-section and with a longitudinally disposed wide groove 21 extending inwardly beyond the axis of the blank. The blank may then be severed longitudinally midway between the sides 22, 23 of said groove, as on the line 24 in said figure. Such severing provides a pair of tool-clamping members, whose rearward abutting edges may be cut down as hereinbefore explained, as along the dotted lines 25, in Figure 3.

The two members 1 and 7 of the tool-carrier being provided, they may be bolted together by the bolts 9, with a suitable filler piece (not shown) between them, such filler piece being somewhat thicker than the tool to be used in the tool-carrier. In such bolted-together condition the edge of the rearward portion 13 of the tool-clamping member 7 abuts against the side 14 of the recess 6. The periphery of the entire tool-carrier is now cut or turned down in a lathe to the desired diameter, such periphery when such turning operation is finished being shown at 26 in Figure 1. It will be seen that inasmuch as the filler piece is somewhat thicker than the tool to be used in the tool-carrier, the tool-clamping member will more tightly clamp the tool near its cutting edge than rearwardly therefrom when the tool is held between the members 1 and 7. The body member 1 may be formed in initial or rough form to extend beyond its finished periphery 26, such extensions being shown in dotted lines at 27 in Figure 1. Dotted arcuate lines 28 in said figure illustrate the degrees to which the body member may be turned or dressed down to provide a tool-carrier of desired diameter; and dotted arcuate lines 29 in Figure 3 illustrate degrees to which the tool-clamping member may be dressed or turned down for the same purpose. The dotted lines 30 in Figure 1 illustrate positions of the surface of the table portions 3 to which such portions may be cut or dressed to accommodate tools of greater thickness.

It will be seen that by my process or method of making a tool-carrier, the members 1 and 7 as initially formed may be readily machined, turned or dressed down to desired degrees; and that such members as initially formed may be at any time readily modified or changed so as to form a tool-carrier of less diameter, or one adapted to tools of different thickness.

Suitable openings 40 are provided through which a tool may be thrust to adjust the position of the plane bits.

The invention being intended to be pointed out in the claims, is not to be limited to or by details of the processes or methods hereinbefore set forth, further than as pointed out in the claims.

I claim:

1. The method of making a rotatable tool-carrier for a machine of the character described, which method consists in; forming an elongated body member with means at its ends for mounting the same rotatably, and with a table portion and first and second recesses adjacent the opposite sides respectively of the table portion; forming a tool-clamping member adapted to co-operate with the table portion adjacent the first recess to clamp the tool therebetween, and having a portion adapted to abut in the tool-clamping position of said members against that side of the second recess which is remote from the tool; clamping said two members together in tool-clamping relation with a filler piece between them; and cutting down the periphery of said assembled two members in a lathe.

2. The method of making a rotatable tool-carrier for a machine of the character described, which method consists in; forming an elongated body member with means at its ends for mounting the same rotatably, and with a table portion and first and second recesses adjacent the opposite sides respectively of the table portion; forming a tool-clamping member adapted to cooperate with the table portion adjacent the first recess to clamp the tool therebetween, and having a portion adapted to abut in the tool-clamping position of said members against that side of the second recess which is remote from the tool; clamping said two members together in tool-clamping relation with a filler piece thicker than the tool between them; and cutting down the periphery of said assembled two members in a lathe.

3. The method of making the elongated body member of a rotatable tool-carrier for a machine of the character described, which method consists in; rolling a metal blank lengthwise through a rolling mill to form thereon a table portion and longitudinally extending first and second recesses adjacent the opposite sides respectively of the table portion; and dressing down the surface of the table portion.

4. The method of making a rotatable tool-carrier for a machine of the character described, which method consists in; forming an elongated body member by rolling a metal blank lengthwise through a rolling mill to form thereon a table portion and longitudinally extending first and second recesses adjacent the opposite sides respectively of the table portion; dressing down the surface of the table portion; forming a tool-clamping member adapted to co-operate with said table portion adjacent the first recess to clamp the tool therebetween, and having a portion adapted to abut in the tool-clamping position of said members against that side of the second recess which is remote from the tool; and cutting down said abutting portion of the tool-clamping member sufficiently to enable said members to securely clamp the tool between them.

5. The method of making a pair of tool-clamping members of a rotatable tool-carrier for a machine of the character described, which method consists in; forming an elongated blank substantially circular in cross section and with a longitudinally disposed groove extending inwardly beyond the axis of the blank; and severing the blank longitudinally midway between the sides of said groove.

In testimony whereof I have hereunto set my hand at Grand Rapids, Michigan, this 25th day of March, 1921.

JOSEPH W. OLIVER.